United States Patent
Vikberg et al.

(10) Patent No.: US 11,622,398 B2
(45) Date of Patent: Apr. 4, 2023

(54) METHODS AND DEVICES FOR CONNECTING A WIRELESS COMMUNICATION DEVICE TO A USER PLANE IN A WIRELESS COMMUNICATION NETWORK

(71) Applicant: Telefonaktiebolaget LM Ericsson (publ), Stockholm (SE)

(72) Inventors: Jari Vikberg, Järna (SE); Göran Hall, Mölndal (SE); Ulf Mattsson, Kungsbacka (SE); Gunnar Mildh, Sollentuna (SE); Göran Rune, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 39 days.

(21) Appl. No.: 17/258,432

(22) PCT Filed: Jul. 6, 2018

(86) PCT No.: PCT/SE2018/050743
§ 371 (c)(1),
(2) Date: Jan. 6, 2021

(87) PCT Pub. No.: WO2020/009630
PCT Pub. Date: Jan. 9, 2020

(65) Prior Publication Data
US 2021/0282202 A1 Sep. 9, 2021

(51) Int. Cl.
*H04W 76/12* (2018.01)
*H04W 76/22* (2018.01)
*H04W 48/20* (2009.01)

(52) U.S. Cl.
CPC .......... *H04W 76/12* (2018.02); *H04W 48/20* (2013.01); *H04W 76/22* (2018.02)

(58) Field of Classification Search
CPC ...... H04W 76/12; H04W 76/22; H04W 48/20
USPC .............. 370/329, 328, 338, 341, 345, 350
See application file for complete search history.

(56) References Cited

U.S. PATENT DOCUMENTS

2017/0064601 A1* 3/2017 Kubota ............... H04W 36/165

OTHER PUBLICATIONS

3GPP TS 23.501 V15.1.0, "3rd Generation Partnership Project; Technical Specification Group Services and System Aspects; System Architecture for the 5G System; Stage 2 (Release 15)," Mar. 2018, 201 pages, 3GPP Drganizational Partners.

(Continued)

*Primary Examiner* — Nghi H Ly
(74) *Attorney, Agent, or Firm* — Nicholson De Vos Webster & Elliott LLP

(57) ABSTRACT

Methods of connecting a wireless communication device to a user plane in a wireless communication network and devices performing the methods. In one aspect, a network node configured to connect a wireless communication device to a user plane in a wireless communication network comprises a processing unit and a memory containing instructions executable by the processing unit, wherein the network node is to provide core network user plane functionality and/or radio access network user plane functionality, via an interface.

10 Claims, 11 Drawing Sheets

(56) References Cited

OTHER PUBLICATIONS

3GPP TS 23.502 V15.1.0, "3rd Generation Partnership Project; Technical Specification Group Services and System Aspects; Procedures for the 5G System; Stage 2 (Release 15)," Mar. 2018, 285 pages, 3GPP Organizational Partners.

3GPP TS 38.401 V15.1.0, "3rd Generation Partnership Project; Technical Specification Group Radio Access Network NG-RAN; Architecture description (Release 15)," Mar. 2018, 23 pages, 3GPP Organizational Partners.

3GPP TR 38.806 V15.0.0, "3rd Generation Partnership Project; Technical Specification Group Radio Access Network Study of separation of NR Control Plane (CP) and User Plane (UP) for split option 2; (Release 15)," Dec. 2017, 22 pages, 3GPP Organizational Partners.

International Search Report and Written Opinion for Application No. PCT/SE2018/050743, dated May 20, 2019, 13 pages.

ETSI TS 123 501 V15.2.0, "5G; System Architecture for the 5G System (3GPP TS 23.501 version 15.2.0 Release 15)," Jun. 2018, 219 pages, ETSI.

3GPP TS 38.300 V15.2.0, "3rd Generation Partnership Project; Technical Specification Group Radio Access Network MR; NR and NG-RAN Overall Description; Stage 2 (Release 15)," Jun. 2018, 87 pages, 3GPP Organizational Partners.

S. Homma et al., "User Plane Protocol and Architectural Analysis on 3GPP 5G System, draft-hmm-dmm-5g-uplane-analysis-00," Jun. 29, 2018, 28 pages, DMM Working Group, Internet-Draft.

Ericsson et al., "Support of keeping the DL UP termination point on the RAN-CN interface at inter-RAN node bearer mobility—DC aspects," Jul. 2-6, 2018, 3GPP TSG-RAN WG3 NR AH 18-07, R3-184151, Montreal, Canada.

International Preliminary Report on Patentability for Application No. PCT/SE2018/050743, dated Jan. 21, 2021, 9 pages.

3GPP TS 38.413 V15.0.0, "3rd Generation Partnership Project; Technical Specification Group Radio Access Network NG-RAN; NG Application Protocol (NGAP) (Release 15)," Jun. 2018, 264 pages, 3GPP Organizational Partners.

Invitation to Pay Additional Fees for Application No. PCT/SE2018/050743, dated Mar. 28, 2019, 8 pages.

\* cited by examiner

METHODS AND DEVICES FOR CONNECTING A WIRELESS COMMUNICATION DEVICE TO A USER PLANE IN A WIRELESS COMMUNICATION NETWORK

CROSS-REFERENCE TO RELATED APPLICATIONS

This application is a National stage of International Application No. PCT/SE2018/050743, filed Jul. 6, 2018, which is hereby incorporated by reference.

TECHNICAL FIELD

The invention relates to methods of connecting a wireless communication device to a user plane in a wireless communication network, and devices performing the methods.

BACKGROUND

Now, 3rd Generation Partnership Project (3GPP) is standardizing a fifth generation (5G) Core Network (CN), being referred to as 5GC, and Next Generation Radio Access Network (NG-RAN).

FIG. 1 shows a 5G wireless communication network 100 as depicted in 3GPP TS 23.501 comprising a User Equipment (UE, 110) in the form of for instance a mobile phone, tablet, smart phone, Internet-of-Things (IoT) sensor, etc., connecting to a (Radio) Access Network ((R)AN, 111), and to a Data Network (DN, 113) via a User Plane Function (UPF, 112). The UPF is a service function that processes user plane packets; processing may include altering the packet's payload and/or header, interconnection to data network(s), packet routing and forwarding, etc.

Further, the network is shown to comprise a Network Slice Selection Function (NSSF, 114) for handling network slicing, a Network Exposure Function (NEF, 115) for exposing capabilities and events, an NF (Network Function) Repository Function (NRF, 116) for providing discovery and registration functionality for NFs, a Policy Control Function (PCF, 117), Unified Data Management (UDM, 118) for storing subscriber data and profiles, and an Application Function (AF, 119) for supporting specific applications and optionally application influence on traffic routing.

Moreover, the network is shown to comprise an Authentication Server Function (AUSF, 120) for storing data for authentication of UE, a core network control plane function configured to provide mobility management in the form of an Access and Mobility Function (AMF, 121) for providing UE-based authentication, authorization, mobility management, etc., and a core network control plane function configured to provide session management in the form of a Session Management Function (SMF, 122) configured to perform session management, e.g. session establishment, modify and release, etc.

FIG. 2 illustrates a prior art 5G wireless communication network 100 in a different view illustrating a radio base station 124, a so called Next Generation NodeB (gNB), forming part of the NG-RAN. The gNB 124 comprises a radio access network control plane function in the form of a Central Unit Control Plane (CU-CP, 125), a radio access network user plane function in the form of a Central Unit User Plane (CU-UP, 126) and a Distributed Unit (DU, 127) for connecting the NG UE 110 to the control plane and the user plane, respectively, which is referred to as a High Layer Split (HLS). The gNB provides NR control and user plane terminations towards the UE, and is connected via NG-C/N2 and NG-U/N3 to the 5GC. Further, the NG-RAN may comprise Long Term Evolution (LTE) base stations, referred to as ng-eNBs.

The CU-CP 125 hosts the Radio Resource Control (RRC) protocol and the control plane part of the Packet Data Convergence Protocol (PDCP) protocol, while the CU-UP 126 hosts the Service Data Adaptation Protocol (SDAP) protocol and the user plane part of the PDCP protocol. The CU-CP 125 is controlling the CU-UP 126 via an E1 interface.

As shown in FIG. 2, the CU-CP 125 is the function that terminates an N2 interface from the AMF 121 in the 5GC, and the CU-UP 126 is the function terminating an N3 interface from the UPF 112b in the 5GC. Logically, the NG UE 110 has one CU-UP 126 configured per PDU session.

The SMF 122 connects to UPFs 112a, 112b via the N4 interface and to the AMF 121 via the N11 interface. The N11 interface can alternatively be realized using service-based interfaces utilized by the AMF 121 and SMF 122, i.e. Namf and Nsmf, respectively.

FIG. 2 illustrates that the network 100 comprises a plurality of UPFs 112a, 112b, but it is also envisaged that the UPF 112b connecting the NG UE 110 to a local service network 123 via local breakout is omitted, in which case the interface N3 extends between the CU-UP 126 and the UPF 112a.

A problem with this structure is that it results in inefficient user plane handling with multiple different user plane related functions, i.e. DU, CU-UP and one or more UPFs being controlled by separate control plane entities over various interfaces.

SUMMARY

An object of the present invention is to solve, or at least mitigate this problem in the art, and thus to provide an improved method of connecting a wireless communication device to a user plane in a wireless communication network.

This object is attained in a first aspect of the invention by a network node configured to connect a wireless communication device to a user plane in a wireless communication network in which the network node is arranged, the network node comprising a processing unit and a memory, said memory containing instructions executable by said processing unit, whereby the network node is operative to provide core network user plane functionality, and provide radio access network user plane functionality, the network node further being arranged with an interface via which at least one of the core network user plane functionality and the radio access network user plane functionality is configured.

This object is attained in a second aspect of the invention by a method performed by the network node of the first aspect for enabling establishment of user plane connectivity for a wireless communication device with a wireless communication network. The method comprises receiving, from a radio access control network control plane function, a transparent data container comprising configuration data arranged to configure the provided core network user plane functionality, the transparent data container having been prepared at a core network control plane function configured to provide session management, and further receiving configuration data prepared at the radio access control network control plane function arranged to configure the provided radio access network user plane functionality, configuring the core network user plane functionality based on the received configuration data comprised in the transparent data container prepared at the core network control plane function configured to provide session management, and configuring the radio access network user plane functionality based on the received configuration data prepared at the radio access control network control plane function, and establishing the user plane connectivity with the wireless communication device.

This object is attained in a third aspect of the invention by a core network control plane function configured to provide session management for enabling establishment of user plane connectivity for a wireless communication device with a wireless communication network, the core network control plane function configured to provide session management comprising a processing unit and a memory, said memory containing instructions executable by said processing unit, whereby the core network control plane function configured to provide session management is operative to receive, from a core network control plane function configured to provide mobility management, a request to establish user plane connectivity for a wireless communication device, prepare a transparent data container comprising configuration data arranged to configure core network user plane functionality, and transmit, to the a core network control plane function configured to provide mobility management, the transparent data container for further transport to a network node providing said core network user plane functionality and radio access network user plane functionality.

This object is attained in a fourth aspect of the invention by a method performed by a core network control plane function configured to provide session management for enabling establishment of user plane connectivity for a wireless communication device with a wireless communication network.

The method comprises receiving, from a core network control plane function configured to provide mobility management, a request to establish user plane connectivity for a wireless communication device, preparing a transparent data container comprising configuration data arranged to configure core network user plane functionality, and transmitting, to the core network control plane function configured to provide mobility management, the transparent data container for further transport to a network node providing said core network user plane functionality and radio access network user plane functionality.

This object is attained in a fifth aspect of the invention by a core network control plane function configured to provide session management for enabling establishment of a user plane connectivity for a wireless communication device with a wireless communication network, the core network control plane function configured to provide session management comprising a processing unit and a memory, said memory containing instructions executable by said processing unit, whereby the core network control plane function configured to provide session management is operative to receive, from a core network control plane function configured to provide mobility management, a request to establish user plane connectivity for a wireless communication device, prepare configuration data arranged to configure core network user plane functionality, and transmit, to a network node providing said core network user plane functionality and radio access network user plane functionality, the configuration data.

This object is attained in a sixth aspect of the invention by a method performed by a core network control plane function configured to provide session management for enabling establishment of user plane connectivity for a wireless communication device with a wireless communication network. The method comprises receiving, from a core network control plane function configured to provide mobility management, a request to establish user plane connectivity for a wireless communication device, preparing configuration data arranged to configure core network user plane functionality, and transmitting, to a network node providing said core network user plane functionality and radio access network user plane functionality, the configuration data.

This object is attained in a seventh aspect of the invention by a radio access control network control plane function for enabling establishment of user plane connectivity for a wireless communication device with a wireless communication network, the radio access control network control plane function comprising a processing unit and a memory, said memory containing instructions executable by said processing unit, whereby the radio access control network control plane function is operative to receive, from a core network control plane function configured to provide mobility management, a request to establish user plane connectivity for a wireless communication device, prepare a transparent data container comprising configuration data arranged to configure radio access network user plane functionality, and transmit, to the core network control plane function configured to provide mobility management, the transparent data container for further transport to a network node providing said radio access network user plane functionality and core network user plane functionality.

This object is attained in a eighth aspect of the invention by a method performed by a radio access control network control plane function for enabling establishment of user plane connectivity for a wireless communication device with a wireless communication network. The method comprises receiving, from a core network control plane function configured to provide mobility management, a request to establish user plane connectivity for a wireless communication device, preparing a transparent data container comprising configuration data arranged to configure radio access network user plane functionality, and transmitting, to the core network control plane function configured to provide mobility management, the transparent data container for further transport to a network node providing said radio access network user plane functionality and core network user plane functionality.

This object is attained in a ninth aspect of the invention by a radio access control network control plane function for enabling establishment of user plane connectivity for a wireless communication device with a wireless communication network, the radio access control network control plane function comprising a processing unit and a memory, said memory containing instructions executable by said processing unit, whereby the radio access control network control plane function is operative to receive, from a core network control plane function configured to provide mobility management, a request to establish user plane connectivity for a wireless communication device, the request comprising a transparent data container comprising configuration data arranged to configure core network user plane functionality, prepare configuration data for configuring radio access network user plane functionality, and transmit the transparent data container and the prepared configuration data to a network node providing said radio access network user plane functionality and said core network user plane functionality.

This object is attained in a tenth aspect of the invention by a method performed by a radio access control network control plane function for enabling establishment of user plane connectivity for a wireless communication device with a wireless communication network. The method comprises receiving, from a core network control plane function configured to provide mobility management, a request to establish user plane connectivity for a wireless communication device, the request comprising a transparent data container comprising configuration data arranged to configure core network user plane functionality, preparing configuration data for configuring radio access network user plane functionality, and transmitting the transparent data container and the prepared configuration data to a network node providing said radio access network user plane functionality and said core network user plane functionality.

Hence, in aspects of the invention, a network node referred to herein as a Combined RAN and CN User Plane Function (CRC-UPF) is introduced in which UPF functionality and CU-UP functionality are integrated. Hence, the CRC-UPF hosts the SDAP protocol and the user plane part of the PDCP protocol. The CU-CP is controlling the CU-UP functionality of the CRC-UPF via an E1 interface. Further, the CRC-UPF is arranged with a tunneled interface—replacing the former N4 interface between a prior art UPF and SMF—passing over the CU-CP and the AMF to the SMF via which the SMF is controlling the UPF functionality of the CRC-UPF. Hence, the tunneled interface of the CRC-UPF passes over the E1, N2 and N11 interfaces.

This interface passing over E1-N2-N11 is "tunneled" in the sense that a so called transparent data container is prepared at the SMF and sent over the tunneled interface via the AMF and the CU-CP which just forward the data container to the CRC-UPF being the final destination (which principle also applies for the opposite direction). Thus, the AMF and the CU-CP do not process the data included in the container, but merely relay the data container to the CRC-UPF.

Advantageously, with the CRC-UPF, user plane latency as well as number of signalling interfaces in the network is reduced. For example, the CRC-UPF only needs to terminate the E1 interface from the CU-CP instead of terminating both E1 and N4 interfaces. Further, the CRC-UPF advantageously also enables removal of the user plane tunnel between 5GC and NG-RAN as the N3 interface becomes an internal interface in the CRC-UPF In further aspects, the CU-CP is controlling the CU-UP functionality of the CRC-UPF via the N2 interface. Hence, the CRC-UPF is arranged with a tunneled interface—replacing the former E1 interface between the prior art CU-UP and the CU-CP—passing over the SMF and the AMF to the CRC-UPF via which the CU-CP is controlling the CU-UP functionality of the CRC-UPF Hence, the tunneled interface of the CRC-UPF passes over the N4, N11 and N2 interfaces.

In analogy with the previously discussed tunneled interface, this interface passing over N2-N11-N4 is "tunneled" in the sense that a so called transparent data container is prepared at the CU-CP and sent over the tunneled interface via the AMF and the SMF which just forward the data container to the CRC-UPF being the final destination (again, this principle also applies for the opposite direction). Thus, the AMF and the SMF do not process the data included in the container, but merely relay the data container to the CRC-UPF.

Advantageously, with the CRC-UPF user plane latency as well as number of signalling interfaces in the network is reduced. Further, the CRC-UPF advantageously also enables removal of the user plane tunnel between 5GC and NG-RAN as the N3 interface becomes an internal interface in the CRC-UPF.

Further embodiments of the invention will be discussed in the following.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
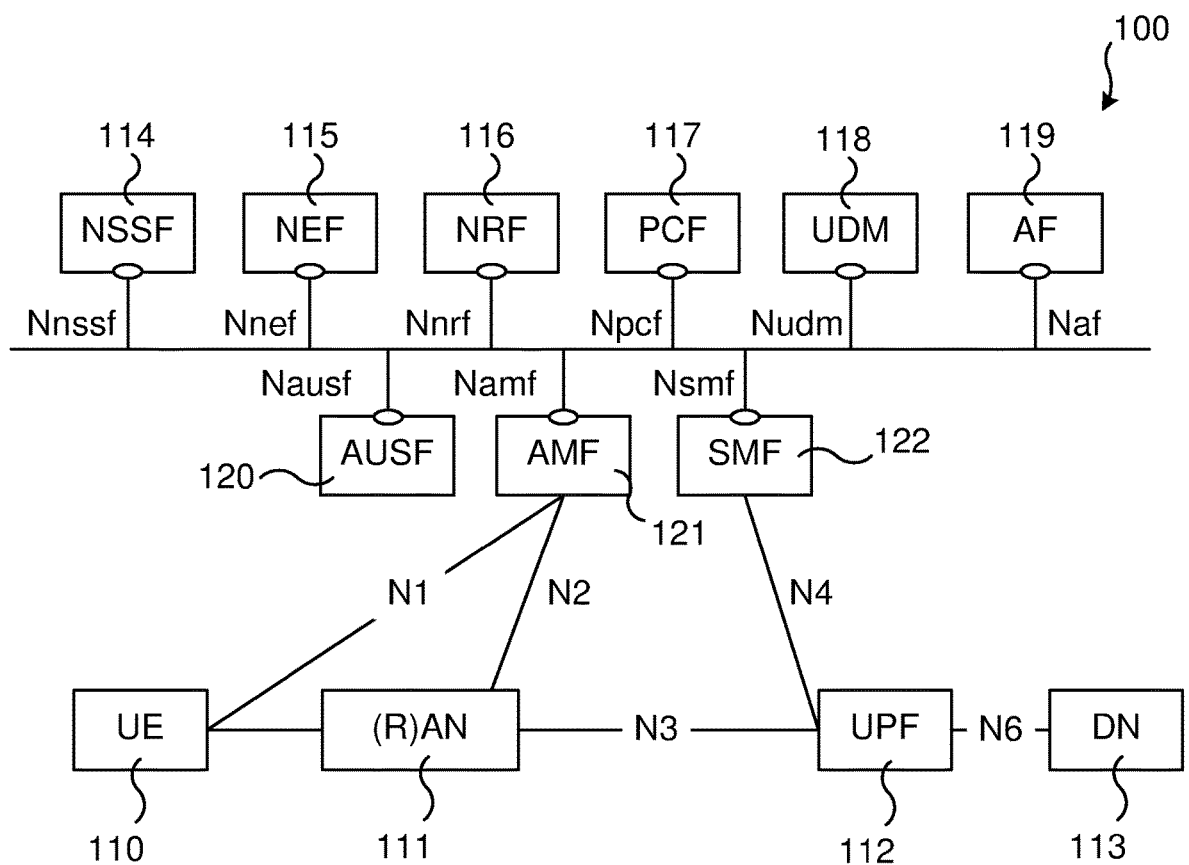
FIG. 1 shows a prior art 5G wireless communication network.

FIG. 1 shows a prior art 5G wireless communication network having been previously discussed.

Figure 2:
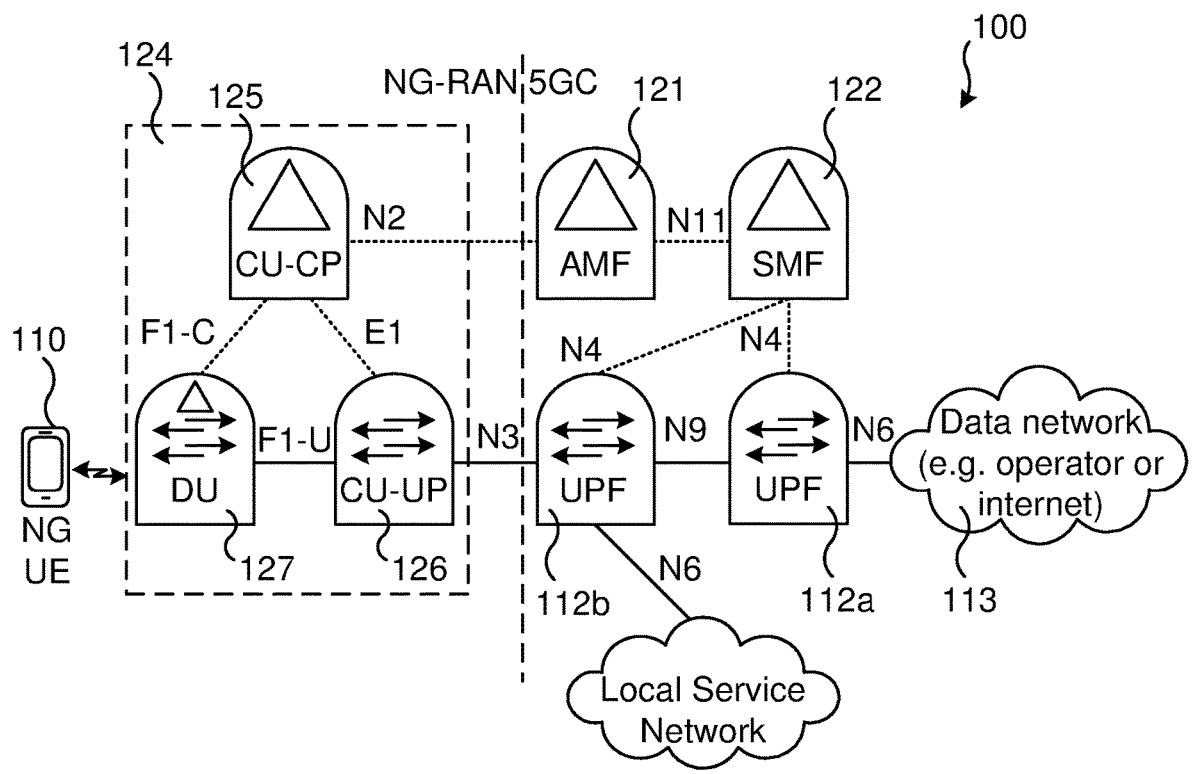
FIG. 2 illustrates a prior art 5G wireless communication network in a different view.

FIG. 2 illustrates a prior art 5G wireless communication network in a different view, also having been previously discussed.

Figure 3:
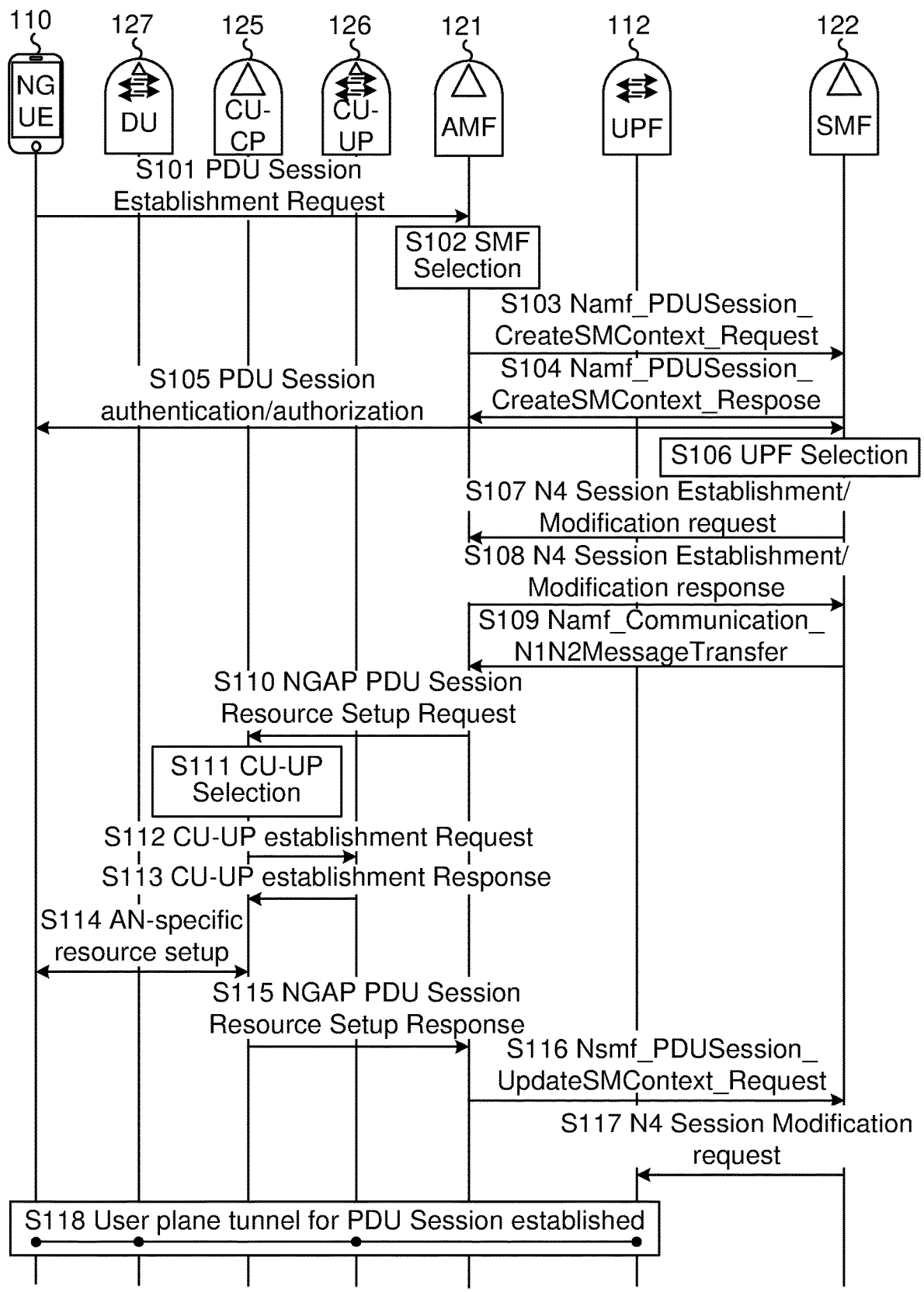
FIG. 3 shows a signalling diagram illustrating establishment of a communication session for an wireless communication device in the prior art 5G communication network of FIG. 2.

FIG. 3 shows a signalling diagram illustrating establishment of Packet Data Unit (PDU) session for an NG UE 110 in the prior art 5G communication network 100 previously described with reference to FIG. 2.

In a first step S101, the NG UE no sends a request for establishment of a PDU session to the AMF 121 which in step S102 selects an SMF 122 via which the PDU session will be managed.

In step S103, the AMF 121 sends the PDU session request to the selected SMF 122, which transmits a response message back to the AMF 121 in step S104 before carrying through a PDU Session authentication/authorization procedure with the NG UE 110 in step S105.

If the SMF 122 successfully authenticates the NG UE 110, a UPF 112 is selected in step S106, via which the NG UE 110 will connect to the user plane of the network 100. The SMF 122 sends an N4 session establishment request to the selected UPF 112 in step S107, and the UPF 112 sends a response accordingly in step S108 comprising for instance an UPF transport address and an UPF Tunnel Endpoint Identifier (TEID).

The SMF 122 will in its turn forward the received data to the AMF 121 in step S109, which sends a request to the CU-CP 125 in step S110 to setup PDU session resources for the PDU session to be established, the request comprising the UPF transport address and the UPF TEID.

The CU-CP 125 selects a CU-UP 126 in step S111 via which the PDU session is to be established with the UPF 112, and a request to this effect is sent to the selected CU-UP 126 in step S112, which responds in step S113 with a CU-UP establishment response comprising for instance a CU-UP transport address and a CU-UP TEID.

Thereafter, the CU-CP 125 performs an AN resources setup procedure with the NG UE 110 in step S114 (the DU can also be configured in relation to this step) and sends a setup PDU session resources response (to the message received in step S110) to the AMF 121 containing the CU-UP transport address and the CU-UP TEID in step S115. The AMF 121 will in its turn send a message comprising the CU-UP transport address and the CU-UP TEID to the SMF 122 in step S116, which sends the CU-UP transport address and the CU-UP TEID to the UPF 112 in step S117.

Finally, in step S118, the PDU session is established with a user plane between the NG UE 110, the DU 127, the CU-UP 126 and the UPF 112.

As described with reference to FIG. 3, the UPF 112 and CU-UP 126 are selected independently of each other and these functions are also configured using separate interfaces, i.e. the UPF 112 is configured by the SMF 122 using the N4 interface and the CU-UP 126 is configured by the CU-CP 125 using the E1 interface. FIG. 3 shows a scenario where a single UPF 112 is selected by the SMF 122. The SMF 122 may also select multiple UPFs 112a, 112b connected via N9 interface as shown in FIG. 2.

The separation of 5GC UPF 112 and NG-RAN CU-UP 126 functions has its reasons; e.g. that different domains control their own functionality (both in 3GPP and in the vendor community). The separation does however include user plane efficiency aspects as each user plane PDU needs to traverse through both 5GC UPF 112 and NG-RAN CU-UP 126 functions, and a possible transport network between these functions. This creates unnecessary user plane latency. This is particularly apparent in a scenario where both 5GC UPF 112 and NG-RAN CU-UP 126 would be virtualized and run on a same virtualization platform on different virtual machines or containers (as each user plane PDU must pass via the virtualization platform between the different user plane functions).

Further, as can be concluded from the signalling diagram of FIG. 3, establishing a PDU session in a 5G network requires quite a few rounds of signalling, as user plane functions are selected and configured separately and also in sequence, i.e. 5GC UPF 112 is selected first followed by selection of NG-RAN CU-UP 126.

Figure 4:
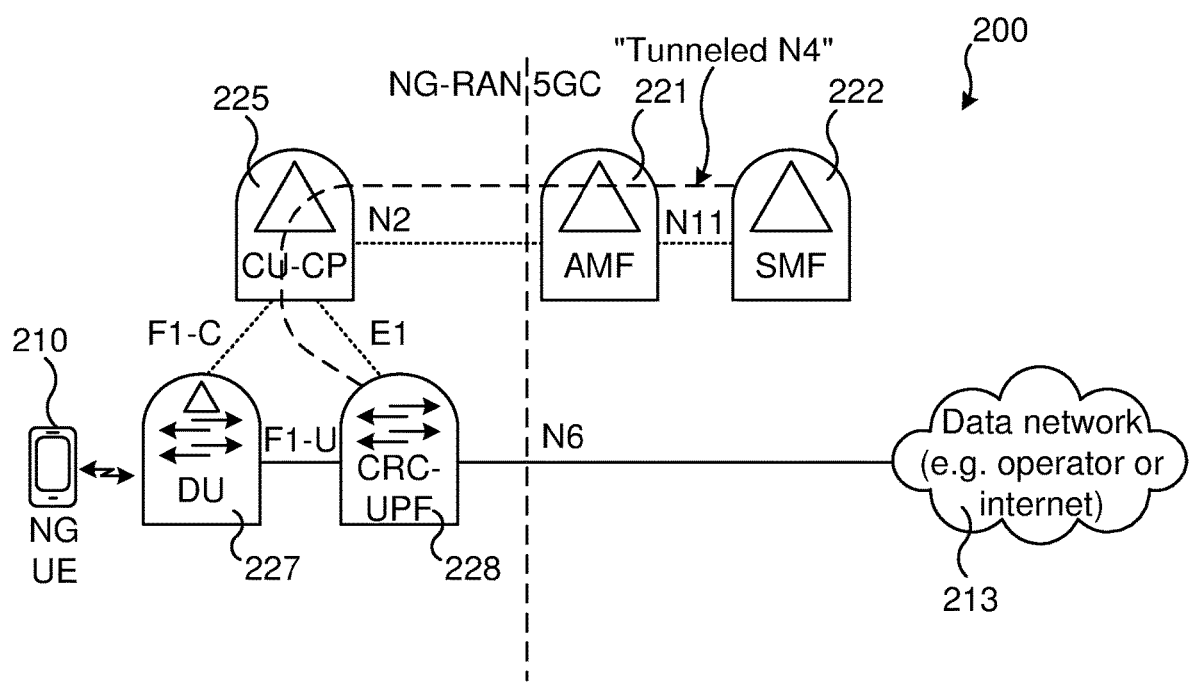
FIG. 4 illustrates a 5G communication network implementing a network node configured to connect a wireless communication device to a user plane in the network according to an embodiment.

FIG. 4 illustrates a 5G communication network 200 implementing a network node 228 configured to connect a wireless communication device 210 (i.e. the NG UE) to a user plane in the network 200 according to an embodiment.

In the following, the network node 228 according to the embodiment will be referred to as a Combined RAN and CN User Plane Function (CRC-UPF).

As is shown in FIG. 4, the NG-RAN comprises a CU-CP 225 hosting the RRC protocol and the control plane part of the PDCP protocol. The CU-CP 225 connects to an AMF 221 via the N2 interface, and to a DU 227 via an F1-C interface, which DU 227 is responsible for connecting the NG UE 210 to the control plane via interface F1-C and to the user plane via interface F1-U.

In this embodiment, the UPF functionality and CU-UP functionality is integrated within the CRC-UPF 228. Hence, the CRC-UPF 228 hosts the SDAP protocol and the user plane part of the PDCP protocol. The CU-CP 225 is controlling the CU-UP functionality of the CRC-UPF via an E1 interface. The CRC-UPF 228 connects to data network 213 via an N6 interface (and possibly also via an N9 interface in case multiple UPFs are used, as discussed hereinabove).

Further, the CRC-UPF 228 is arranged with a tunneled interface—replacing the former N4 interface illustrated with reference to FIG. 2 between the prior art UPF 112a and the SMF 122—passing over the CU-CP 225 and the AMF 221 to the SMF 222 via which the SMF 222 is controlling the UPF functionality of the CRC-UPF 228. Hence, the tunneled interface of the CRC-UPF 228 passes over the E1, N2 and N11 interfaces. The N11 interface can alternatively be realized using service-based interfaces utilized by the AMF 221 and SMF 222, i.e. Namf and Nsmf, respectively.

This interface passing over E1-N2-N11 is "tunneled" in the sense that a so called transparent data container is prepared at the SMF 222 and sent over the tunneled interface via the AMF 221 and the CU-CP 225 which just forward the data container to the CRC-UPF 228 being the final destination. Thus, the AMF 221 and the CU-CP 225 do not process the data included in the container, but merely relay the data container to the CRC-UPF 228 (which principle also applies in the opposite direction; from the SCR-UPF to the SMF).

Advantageously, with the CRC-UPF 228 user plane latency as well as number of signalling interfaces in the network is reduced. Further, the CRC-UPF 228 advantageously also enables removal of the user plane tunnel between 5GC and NG-RAN as the N3 interface becomes an internal interface in the CRC-UPF 228.

Figure 5:
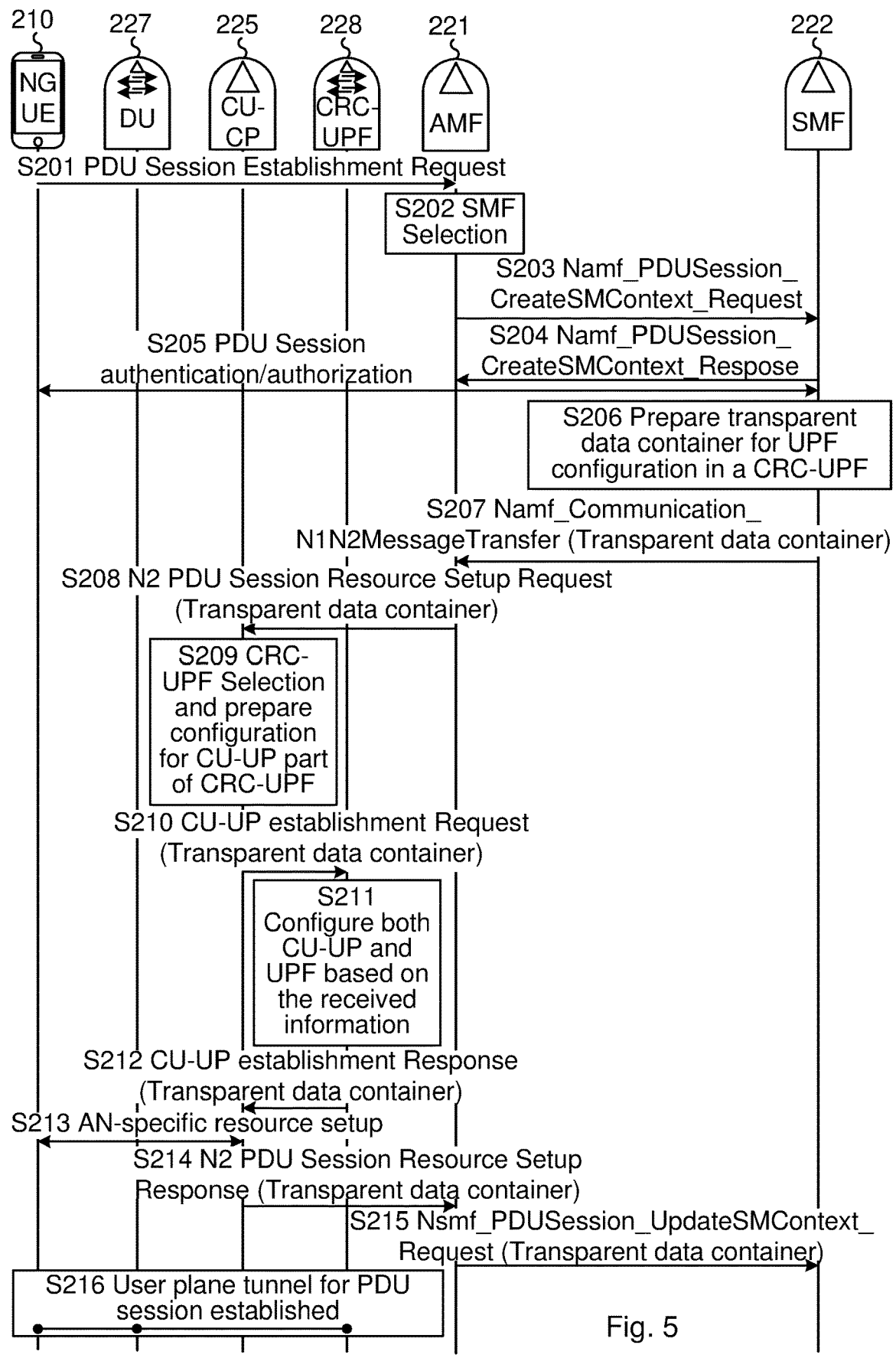
FIG. 5 shows a signalling diagram illustrating establishment of a communication session for a wireless communication device with a 5G communication network according to an embodiment.

FIG. 5 shows a signalling diagram illustrating establishment of a PDU session for the NG UE 210 in the 5G communication network 210 according to an embodiment. The first five steps S201-S205 of the PDU session establishment process are identical to the first five steps S101-S105 as illustrated in FIG. 3.

Hence, in a first step S201, the NG UE 210 sends a request for establishment of a PDU session to the AMF 221 which in step S202 selects an SMF 222 via which the PDU session will be managed.

In step S203, the AMF 221 sends the PDU session request to the selected SMF 222, which transmits a response message back to the AMF 221 in step S204 before carrying through a PDU session authentication/authorization procedure with the NG UE 210 in step S205.

Now, in contrast to the prior art approach of FIG. 2, if the SMF 222 successfully authenticates the NG UE 210, a transparent data container is prepared in step S206 for enabling the tunneled interface discussed hereinabove passing over interfaces N11, N2 and E1, the transparent data container subsequently being transmitted over the N11 interface and which transparent data container comprises configuration data for configuring UPF functionality in the CRC-UPF 228.

The SMF 222 thus sends the transparent data container to the AMF 221 in step S207 over the N11 interface, which sends a request to the CU-CP 225 in step S208 over the N2 interface to setup PDU session resources for the PDU session to be established, the request comprising the transparent data container holding the UPF configuration data.

The CU-CP 225 selects the CRC-UPF 228 in step S209 via which the PDU session is to be established and prepares configuration data for configuring CU-UP functionality in the CRC-UPF 228, and a request to this effect is sent to the selected CRC-UPF 228 in step S210 over interface E1, along with the transparent data container comprising the UPF functionality configuration data received from the AMF 221 in step S208.

The CRC-UPF 228 will thus, in step S211, configure the UPF functionality based on the configuration data contained in the transparent data container prepared at the SMF 222 and configure the CU-UP functionality based on the configuration data prepared at the CU-CP 225, and responds to the CU-UP 226 in step S212 over interface E1. This response may include a transparent data container comprising a confirmation of the configuration of the UPF functionality of the CRC-UPF 228, including for instance a CRC-UPF transport address and a CRC-UPF TEID.

Thereafter, the CU-CP 225 performs an AN resources setup procedure with the NG UE 210 in step S213 and sends a setup PDU session resources response (to the message received in step S208) comprising the transparent data container prepared by the CRC-UPF 228 to the AMF 221 in step S214 over the N2 interface. The AMF 221 will in its turn send a message comprising the transparent data container prepared by the CRC-UPF 228 to the SMF 222 over the N11 interface. The CRC-UPF transport address and the CRC-UPF TEID possibly included in the message would enable establishment of a N9 interface between the CRC-UPF 228 and a further UPF in a scenario where a plurality of UPFs are utilized (cf. FIG. 2).

Finally, in step S216, the PDU session is established with a user plane tunnel between the NG UE 210, the DU 227 and the CRC-UPF 228.

Figure 6:
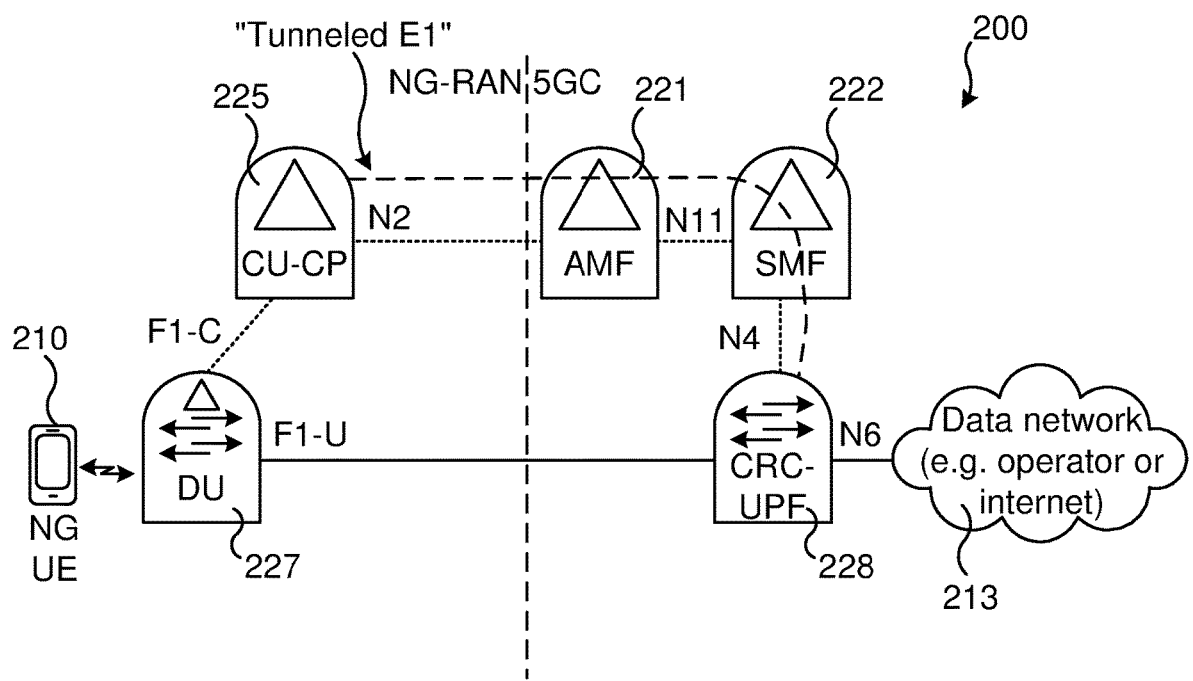
FIG. 6 illustrates a 5G communication network implementing a network node configured to connect a wireless communication device to a user plane in the network according to another embodiment.

FIG. 6 illustrates a 5G communication network 200 implementing a network node 228 configured to connect a wireless communication device 210 (i.e. the NG UE) to a user plane in the network 200 according to another embodiment.

Again, the NG-RAN comprises a CU-CP 225 hosting the RRC protocol and the control plane part of the PDCP protocol. The CU-CP 225 connects to an AMF 221 via the N2 interface, and to a DU 227 via an F1-C interface, which DU 227 is responsible for connecting the NG UE 210 to the control plane via interface F1-C and to the user plane via interface F1-U.

As in the embodiment described with reference to FIG. 4, the UPF functionality and CU-UP functionality are integrated within the CRC-UPF 228. Hence, the CRC-UPF 228 hosts the SDAP protocol and the user plane part of the PDCP protocol. The CRC-UPF 228 connects to data network 213 via an N6 interface (and possibly also via an N9 interface in case multiple UPFs are used, as discussed hereinabove).

However, in this embodiment, the CU-CP 225 is controlling the CU-UP functionality of the CRC-UPF via the N2 interface.

Hence, the CRC-UPF 228 is arranged with a tunneled interface—replacing the former E1 interface illustrated with reference to FIG. 2 between the prior art CU-UP 126 and the CU-CP 125—passing over the SMF 222 and the AMF 221 to the CU-CP 225 via which the CU-CP 225 is controlling the CU-UP functionality of the CRC-UPF 228. Hence, the tunneled interface of the CRC-UPF 228 passes over the N4, N11 and N2 interfaces. The N11 interface can alternatively be realized using service-based interfaces utilized by the AMF 221 and SMF 222, i.e. Namf and Nsmf, respectively.

In analogy with the previously discussed tunneled interface of FIG. 4, this interface passing over N2-N11-N4 is "tunneled" in the sense that a so called transparent data container is prepared at the CU-CP 225 and sent over the tunneled interface via the AMF 221 and the SMF 222 which just forward the data container to the CRC-UPF 228 being the final destination. Thus, the AMF 221 and the SMF 222 do not process the data included in the container, but merely relay the data container to the CRC-UPF 228 (which principle also applies in the opposite direction).

Advantageously, with the CRC-UPF 228 user plane latency as well as number of signalling interfaces in the network is reduced. Further, the CRC-UPF 228 advantageously also enables removal of the user plane tunnel between 5GC and NG-RAN as the N3 interface becomes an internal interface in the CRC-UPF 228.

Figure 7:
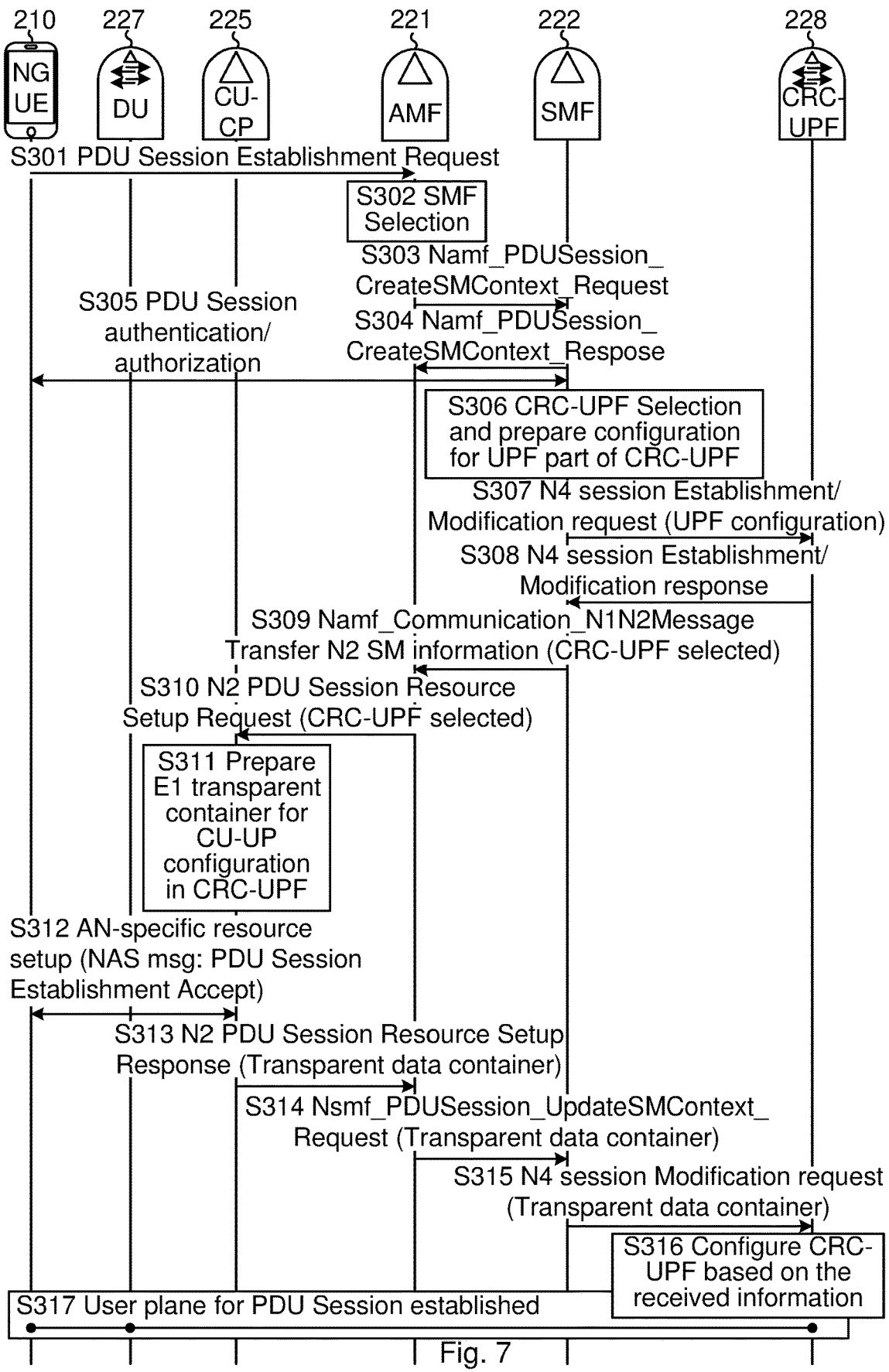
FIG. 7 shows a signalling diagram illustrating establishment of a communication session for a wireless communication device in a 5G communication network according to an embodiment.

FIG. 7 shows a signalling diagram illustrating establishment of a PDU session for the NG UE 210 in the 5G communication network 200 according to an embodiment. Again, the first five steps S301-S305 of the PDU session establishment process are identical to the first five steps S101-S105 as illustrated in FIG. 3.

Hence, in a first step S301, the NG UE 210 sends a request for establishment of a PDU session to the AMF 221 which in step S302 selects an SMF 222 via which the PDU session will be managed.

In step S303, the AMF 221 sends the PDU session request to the selected SMF 222, which transmits a response message back to the AMF 221 in step S304 before carrying through a PDU session authentication/authorization procedure with the NG UE 210 in step S305.

Now, in contrast to the prior art approach of FIG. 2, if the SMF 222 successfully authenticates the NG UE 210, the SMF 222 selects the CRC-UPF 228 in step S306 via which the PDU session is to be established and prepares configuration data for configuring UPF functionality in the CRC-UPF 228, and a request to this effect is sent to the selected CRC-UPF 228 in step S307 over interface N4.

The CRC-UPF 228 may respond to the SMF 226 in step S308 over interface N4. This response may include a transparent data container comprising for instance a CRC-UPF transport address and a CRC-UPF TEID.

The SMF 222 then sends information indicating a CRC-UPF 228 being selected and possibly the CRC-UPF transport address and the CRC-UPF TEID to the AMF in step S309 over the N11 interface, which in its turn sends a request to the CU-CP 225 in step S310 over the N2 interface to setup PDU session resources for the PDU session to be established, the request indicating the selected CRC-UPF 228 and possibly the CRC-UPF transport address and the CRC-UPF TEID.

The CU-CP 225 prepares a transparent data container in step S311, thereby enabling the tunneled interface passing over N2, N11 and N4 discussed hereinabove, the transparent data container subsequently being transmitted back over the N2 interface to the AMF 221, and which transparent data container comprises configuration data for configuring CU-UP functionality in the CRC-UPF 228. Further, DU transport address and DU TEID may be sent in order for the CRC-UPF 228 to subsequently enable downlink user plane functionality.

Thereafter, the CU-CP 225 performs an AN resources setup procedure with the NG UE 210 in step S312 and sends a setup PDU session resources response (to the message received in step S310) comprising the transparent data container prepared by the CU-CP 225 to the AMF 221 in step S313 over the N2 interface. The AMF 221 will in its turn send a message comprising the transparent data container prepared by the CU-CP 225 to the SMF 222 over the N11 interface in step S314. The SMF 222 sends the transparent data container prepared by the CU-CP 225 to the CRC-UPF 228 over the N4 interface in step S315.

The CRC-UPF 228 will thus, in step S316, configure the UPF functionality based on the configuration data prepared at the SMF 222 (if it was not already performed after step S307) and configure the CU-UP functionality based on the configuration data contained in the transparent data container prepared at the CU-CP 225.

Finally, in step S317, the PDU session is established with a user plane between the NG UE 210, the DU 227 and the CRC-UPF 228.

As compared with the embodiments described with reference to FIGS. 4 and 5, this embodiment is particularly advantageous in a scenario where E1 signalling is less frequent, for instance when using stationary UEs.

Figure 8:
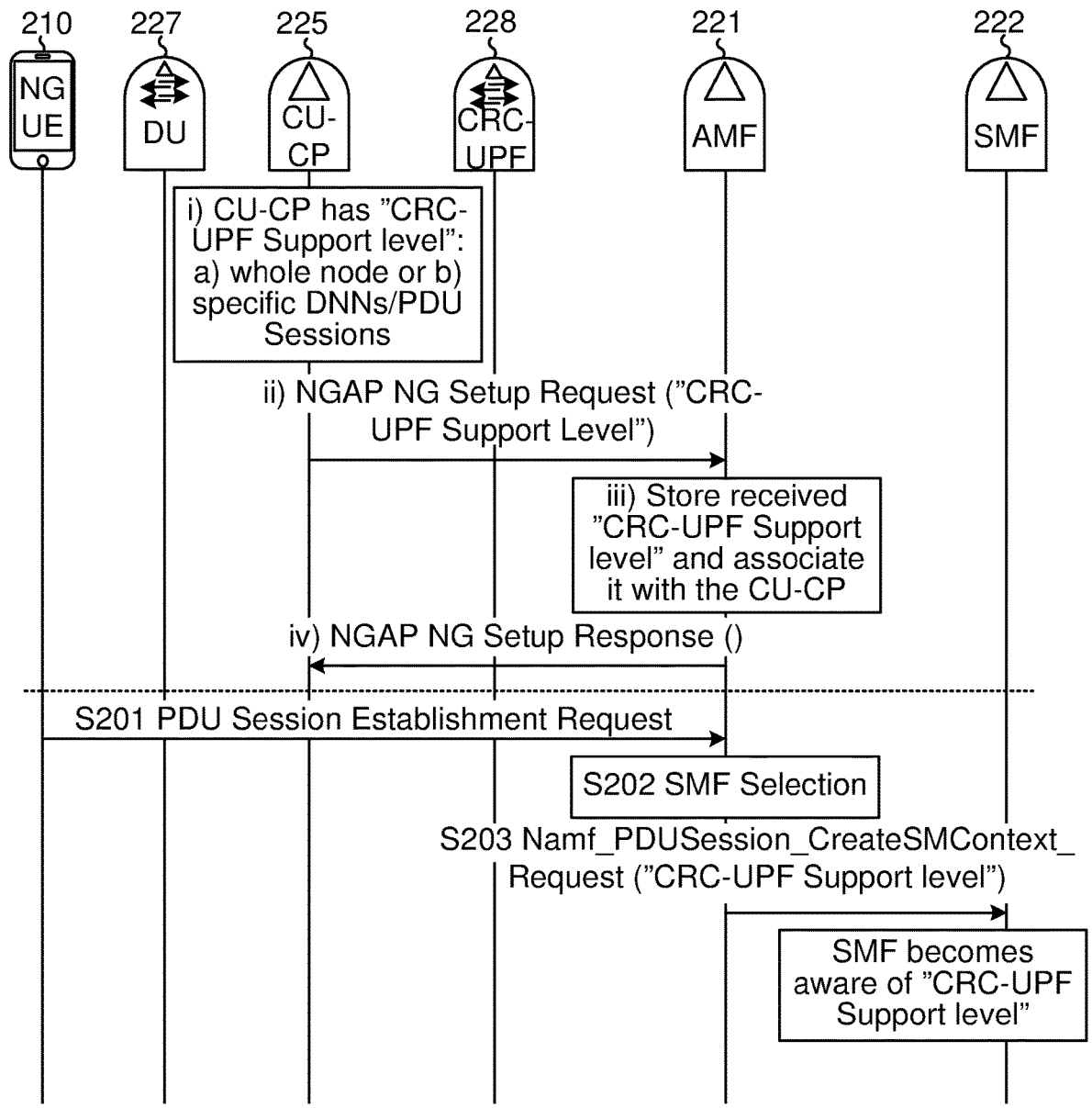
FIG. 8 shows a signalling diagram illustrating a further embodiment.

FIG. 8 shows a signalling diagram illustrating transmittal of indications from the CU-CP 228 that the CRC-UPF 228—and thus the functionality provided by the CRC-UPF 228—is provided in the 5G communication network 200 according to an embodiment.

This indication is an important trigger for the SMF 222 to become aware as to whether the CRC-UPF 228 controlled by NG-RAN is supported or not.

In one scenario the indication is sent when a connection is established between the AMF 221 and the CU-CP 225, e.g. indicating that the CRC-UPF functionality is supported for all UEs and all PDU sessions. This can also be enhanced so that the CU-CP 225 indicates for which Data Network Names (DNNs), PDU sessions, network slices (identified e.g. by Network Slice Instance Identifier (NSI ID), or by Network Slice Selection Assistance Information (NSSAI) and/or Local Area Data Networks (LADNs) the CRC-UPF 228 is supported. The information can be carried for instance in NGAP NG SETUP REQUEST and/or NGAP RAN CONFIGURATION UPDATE messages (as defined in 3GPP TS 38.413) sent from the CU-CP 225 to the AMF 221.

As exemplified in FIG. 8, the CU-CP 225 determines in step i) that the CRC-UPF 228 indeed is arranged in the network 200 and which UPF functionality is provided by the CRC-UPF 228 and sends in step ii) an indication thereof to the AMF 221, which stores the received information in step iii) and sends a response to the CU-CP 25 in step iv).

Now, using the reference numerals of previously described FIG. 5. the NG UE 210 sends a request for establishment of a PDU session to the AMF 221 in step S201, which AMF in step S202 selects an SMF 222 via which the PDU session will be managed.

In step S203, the AMF 221 sends the PDU session request to the selected SMF 222, which in this embodiment comprises the SMF 222 receiving a message indicating whether the CRC-UPF 228 providing radio access network user plane functionality and core network user plane functionality is arranged in the wireless communication network 200, and which core and radio access network user plane functionality is provided by the CRC-UPF 228.

As is understood, the message indicating whether the CRC-UPF 228 providing radio access network user plane functionality and core network user plane functionality is arranged in the wireless communication network 200, and which core and radio access network user plane functionality is provided by the CRC-UPF 228 could also be a part of the message sent in step S303 of FIG. 7.

In another scenario the indication is sent as part of UE-related signalling, e.g. when the UE context is created, modified or about to be created in the NG-RAN. In this case, the indication would apply for the UE 210 and all of its PDU sessions. This case can however also be enhanced so that the CU-CP 225 indicates for which UE DNNs/PDU sessions/ networks slices/LADNs it supports the CRC-UPF 228. The information can be carried for instance in an NGAP INITIAL CONTEXT SETUP RESPONSE message (as defined in 3GPP TS 38.413) sent from the CU-CP 225 to the AMF 221 for example during mobility management-related procedures such as registration.

As can be concluded, the signalling from the NG-RAN is to the SMF 222. Following current principles, the AMF 221 would relay the information between the NG-RAN (i.e. the CU-CP 225) and the SMF 222. It is also possible that the NG-RAN would send the indication directly to the SMF 222 if such a direct interface is introduced or standardized in the future. Finally, the SMF 222 uses the indication as to if the CRC-UPF 228 is supported when PDU sessions are created or modified for the UE 210, for example the SMF 222 decides if "normal" UPF(s) or those included in the CRC-UPF 228 is to be used for a PDU session of the UE 210. In still another variant, the NG-RAN indication of CRC-UPF 228 is not signalled to the SMF 222 but instead the SMF 222 is locally configured with this information.

A plurality of the above scenarios are based on the CU-CP 225 indicating support for the CRC-UPF 228. A different principle is that the network is configured so that CRC-UPFs 228 are available in specific areas, for example on registration area level. Also in this case different levels are possible i.e. that the CRC-UPFs are supported for all DNNs/PDU sessions/networks slices/LADNs or only for specific DNNs/ PDU sessions/networks slices/LADNs. In this case the configuration of CRC-UPF support can be maintained also in 5GC, e.g. in the AMF 221 and the AMF 221 forwards this information to the SMF 222. The SMF 222 can also maintain the CRC-UPF support on registration area level, assuming that SMF 222 is aware of the current registration area of the UE 210.

Figure 9:
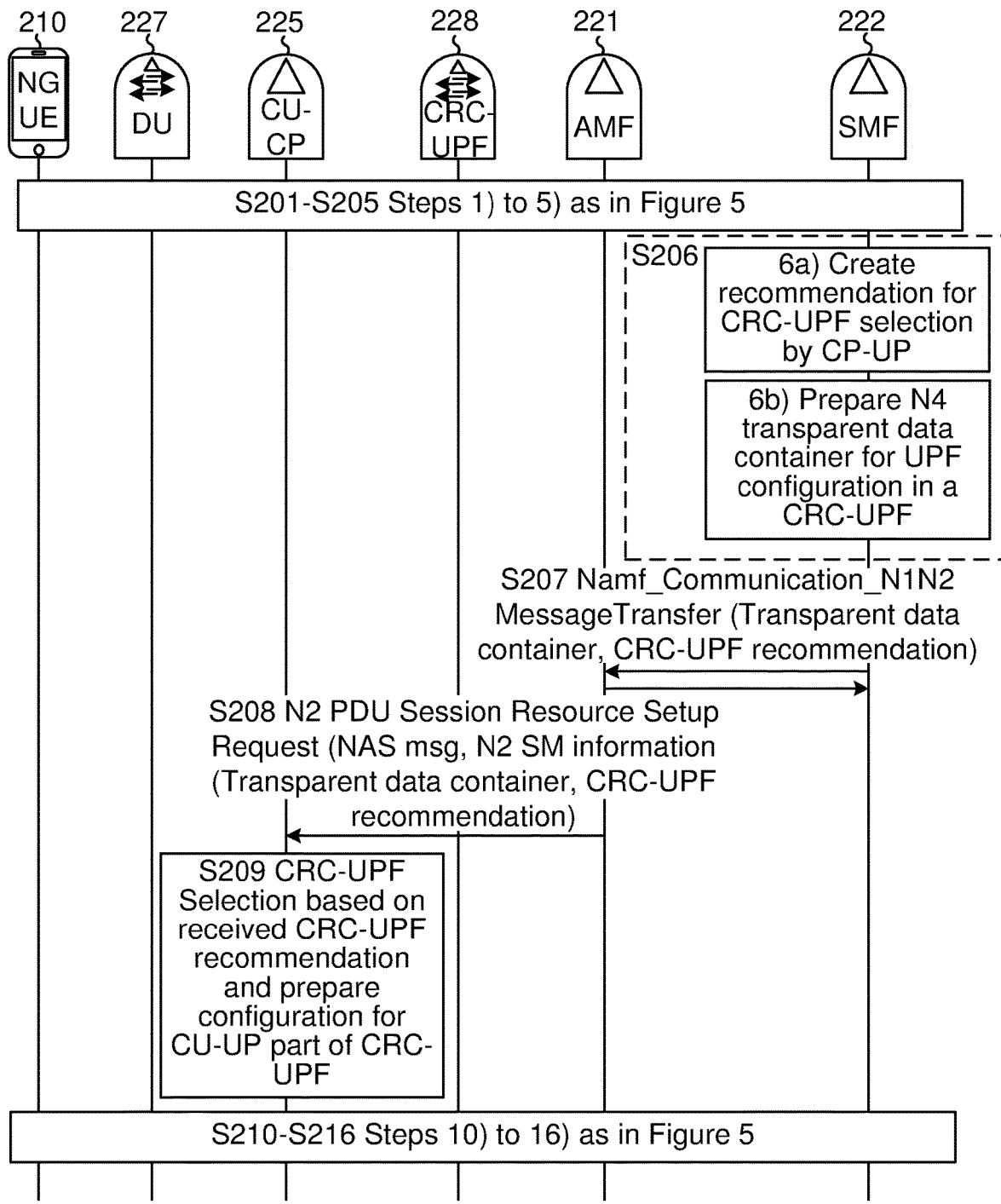
FIG. 9 shows a signalling diagram illustrating yet a further embodiment.

FIG. 9 shows a signalling diagram illustrating transmittal of indications from the SMF 222 to the CU-CP 225 which CRC-UPF 228—and thus the functionality provided by the CRC-UPF 228—can be selected in the 5G communication network 210 according to an embodiment, and possibly which functionality the CRC-UPF 228 provides.

In this embodiment, the SMF 222 provides recommendations about which CRC-UPF 228 the CU-CP 225 should select. The SMF 222 has information on a core network-level, such as UE subscription and policies related information. In addition, the core network-level information may contain persistent or historical information related to the UE 210, e.g. UE mobility patterns.

This information is useful also in the selection of CRC-UPF 228 as it enables differentiation of network functionality supported for different subscriptions and UE types. In addition, the SMF 222 may recommend a specific CRC-UPF 228 because it is connected to specific local service network or the SMF 222 has knowledge of the optimal path from a CRC-UPF 228 to the next cascaded UPF over the N9 interface.

The SMF 222 needs to have some knowledge about the different CRC-UPFs 228 that the CU-CP 225 may select. Otherwise, it would not be possible to provide a recommendation of selection of CRC-UPF.

The knowledge about different CRC-UPFs may differ from situation to situation. For instance, the SMF 222 may have knowledge regarding in which network sites, or types of network sites, the different CRC-UPFs are located and may provide a recommendation accordingly. Hence, the SMF 222 may provide a recommendation identifying one specific network site in which a CRC-UPF should be selected. A network site type may be defined e.g. as a radio site, hub site, central office site, aggregation site, etc.

In another example, the SMF 222 has knowledge about different CRC-UPF types, for example about the particular UPF functionality supported in the different CRC-UPFs. In this case, the SMF recommendation would then be about a specific CRC-UPF type.

In still another example, the SMF 222 has exact knowledge about all CRC-UPFs deployed in the network (and accessible from the current CU-CP). In this case the recommendation would be a specific CRC-UPF to select.

When the CU-CP 225 receives the recommendation(s) from SMF 222, it may take different actions. For instance, the CU-CP 225 may straightforwardly follow the recommendation from the SMF 222 and select a CRC-UPF 225 based on the recommendation (i.e. either based on network site, network site type, CRC-UPF type or a specific CRC-UPF). The CU-CP 225 may also consider local RAN information about the different CRC-UPFs (e.g. load in the different CRC-UPFs, distance between CRC-UPF and the current DU(s) for the UE 210, and any local RAN information related to the UE). In this case, the CU-CP 225 may either follow the SMF recommendation or select another CRC-UPF.

The above description relates to a single SMF recommendation for the CU-CP selection of CRC-UPFs. This may be extended to providing multiple indications of same type, i.e. a list of recommendations. In one example, the list contains two or more different CRC-UPFs that the CU-CP 225 should use in the CRC-UPF selection. In this case, the local RAN information may impact which of the indicated CRC-UPFs is selected by CU-CP 225.

In still another case, the list of recommendations of same type may be prioritized. This means that the SMF 222 provides an indication of the priority or preference in which order the CU-CP 225 should attempt to select CRC-UPFs.

In still another case, the list of recommendations may include indications of different types. This list may also be prioritized, and one example is that highest priority in the list of recommendations may consist of a specific CRC-UPF while the second highest priority in the list of recommendations may consist of a specific CRC-UPF type.

This can also be used to enable the SMF 222 to send a new recommendation for a CRC-UPF already selected and controlled by the NG-RAN (i.e. by the CU-CP 225). In this case, the recommendation relating to the new CRC-UPF to be selected by the CU-CP 225 is as described above for an initial recommendation of a particular CRC-UPF. Assuming that the CU-CP 225 follows the re-recommendation from the SMF 222, the CU-CP 225 may remain but the selected CRC-UPF changes. Thus, a re-selection of CRC-UPF is performed based on the new recommendation.

FIG. 9 shows one example of SMF recommendation for CRC-UPF selection by the CU-CP 225. The first five steps Ss02-S205 are identical to those described with reference to FIG. 5.

However, following the PDU session authentication/authorization of step S205, step S206 will in addition to preparing the transparent data container comprising the UPF configuration data further comprise the action of preparing at least one recommendation to the CU-CP regarding CRC-UPF selection, such as e.g. which particular CRC-UPF 228 should be selected by the CU-CP 225.

This recommendation is sent to the AMF 221 in step S207 over the N11 interface along with the transparent data container to the AMF 221, which sends a request to the CU-CP 225 in step S208 over the N2 interface to setup PDU session resources for the PDU session to be established, the request comprising the transparent data container holding the UPF configuration data, as well as the recommendation for CRC-UPF selection, which the CU-CP 225 will consider when selecting the CRC-UPF 228.

The CU-CP 225 selects, in line with the recommendation prepared by the SMF 222, the CRC-UPF 228 in step S209 via which the PDU session is to be established and prepares configuration data for configuring CU-UP functionality in the CRC-UPF 228, and a request to this effect is sent to the selected CRC-UPF 228 in step S210 over the tunneled interface provided via E1, along with the transparent data container comprising the UPF functionality configuration data. The remaining steps S210-S216 are performed as previously described with reference to FIG. 5.

It is further envisaged that the SMF 222 provides recommendations about how the CU-CP 225 shall reselect a CRC-UPF, e.g. at UE mobility.

The recommendation can be based on the SMF 222 being aware in which areas a specific DNN is available, e.g. provided through local breakout functionality to a local service network with remotely deployed applications e.g. in a Edge/Distributed Cloud. One example of this is a PDU session for LADN and the related LADN area that defines where the LADN is available. The LADN area can be defined as a specific part of the network, for example as a list of tracking areas. The SMF recommendation is again on a PDU session level and defines that when the UE 210 is about to leave the LADN area, the CU-CP 225 shall take specific actions for the PDU session restricted to the LADN area. One action is to use the recommendation to not select a new CRC-UPF as long as there is connectivity from the target CU-CP 225 to the CRC-UPF 228. Another action is to trigger release of the PDU Session when the UE 210 leaves the LADN Area. This type of release is typically performed by the SMF 222. The CU-CP 225 may however indicate to the SMF 222 the need to release the PDU session.

A number of mechanisms may be envisaged for controlling CRC-UPF selection by either the CU-CP 225 or the SMF 222.

The SMF 222 can either provide a recommendation for CRC-UPF selection or perform the selection of the CRC- UPF. These different embodiments can also be used simultaneously in a network. The basic principles for this are as follows:

1 The CU-CP 225 is configured with information and logic defining if SMF recommendations for CRC-UPF selection, or SMF selection of a CRC-UPF, are allowed. This configuration can be for all PDU sessions or for specific PDU sessions only.

2 The SMF 222 is configured with information and logic defining if SMF recommendations for CRC-UPF selection, or SMF selection of a CRC-UPF, are allowed. Again, this configuration can be for all PDU sessions or for specific PDU sessions only.

3 As an alternative to a local configuration in the SMF 222, the CU-CP 225 may signal to the SMF 222 if SMF recommendations for CRC-UPF selection, and/or SMF selection of a CRC-UPF, are allowed. For instance, with reference to FIG. 8, this can be signalled to the SMF 222 in step S203.

4 The signalling from the SMF 222 to the CU-CP 225 is extended with an indication if the included information is an SMF recommendation for CRC-UPF selection, or SMF selection of a CRC-UPF 228. This indication can be added to the SMF recommendation for CRC-UPF selection as shown in steps S207 and S208 of previously described FIG. 9.

5 The CU-UP 225 uses the locally configured information and logic, and uses in step S209 of FIG. 9 the recommendation prepared by the SMF 222 how to perform CRC-UPF selection.

As discussed hereinabove, reselection of a CRC-UPF is envisaged after a communication session has been established with the UE 210. For instance, due to UE mobility, an established PDU session of the UE 210 may be transferred from one CRC-UPF to another. Other scenarios include a) changing the CU-CP but maintaining the CRC-UPF, b) changing the CRC-UPF but maintaining the CU-CP, and c) changing both the CU-CP and the CRC-UPF.

For instance, a UE may initially be connected to a source CU-CP and move from a source DU to a new, target DU, and further from the source CU-CP to a corresponding new, target CU-CP, while the CRC-UPF is maintained. In addition, the E1 interface signalling for the UE is moved from being performed with the source CU-CP via the CRC-UPF to being performed with the target CU-CP via the CRC-UPF, meaning that the tunneled interface (replacing the old N4 interface) is moved with the E1 interface.

The transfer of the UE communication from the source CU-CP to the target CU-CP is triggered as Xn handover, i.e. via the direct Xn interface connecting the source CU-CP to the target CU-CP (or via N2/NG-C handover). Thus, normal Xn handover signalling takes place and in addition the source CU-CP provides information about the UE context in the CRC-UPF to the target CU-CP. The UE context information contains E1 interface address for the CRC-UPF and a pointer or identifier to the UE context in the CRC-UPF. This enables the target CU-CP to establish the E1 interface to the CRC-UPF. After the Xn handover, the target CU-CP performs a so called "path switch" to the current AMF and therefore also the N2/NG-C interface for the UE is moved. At this point the tunneled interface replacing the old N4 interface is also established between the SMF and the CRC-UPF via the AMF and the target CU-CP, in line with what has previously been described.

In another scenario, the UE is initially connected to a source CRC-UPF and moves from a source DU to a target DU. The CU-CP is maintained, and the CU-CP selects a new, target CRC-UPF for at least one UE PDU session. In addition, the E1 interface signalling for the UE is transferred from being performed between the source CRC-UPF and the CU-CP to being performed between the target CRC-UPF and the CU-CP. Thus, communication via the interface between the SMF 222 and the CRC-UPF 228 is moved to the E1 interface between the target CRC-UPF and the CU-CP.

As part of UE mobility, the CU-CP decides to select the target CRC-UPF for the UE. The CU-CP thus establishes the E1 interface with the target CRC-UPF and configures at least the CU-UP part of the new, target CRC-UPF. The N2 interface between the CU-CP and the AMF is maintained.

In addition, as the CRC-UPF is changed, the CU-CP informs the AMF and SMF about the change of CRC-UPF. This allows the SMF to configure the target CRC-UPF via the N11 interface and the AMF.

In still an additional variant, the CU-CP maintains a local copy of the current N4 configuration, i.e. of the transparent container previously sent from the SMF via the CU-CP to CRC-UPF for a specific UE PDU session, for the source CRC-UPF and forwards this information to the target CRC-UPF when the E1 interface to the target CRC-UPF is established. The different variants can also be combined i.e. the local copy of the N4 configuration can be used initially and then CU-CP informs the AMF and SMF about the change of the CRC-UPF as above. This allows the SMF to reconfigure the CRC-UPF as/if needed.

In a scenario where both CU-CP and CRC-UPF changes, the UE IP anchor point address or local breakout address would also change with the CRC-UPF change, which also happens in the case above when CRC-UPF changes and CU-CP is kept.

Figure 10:
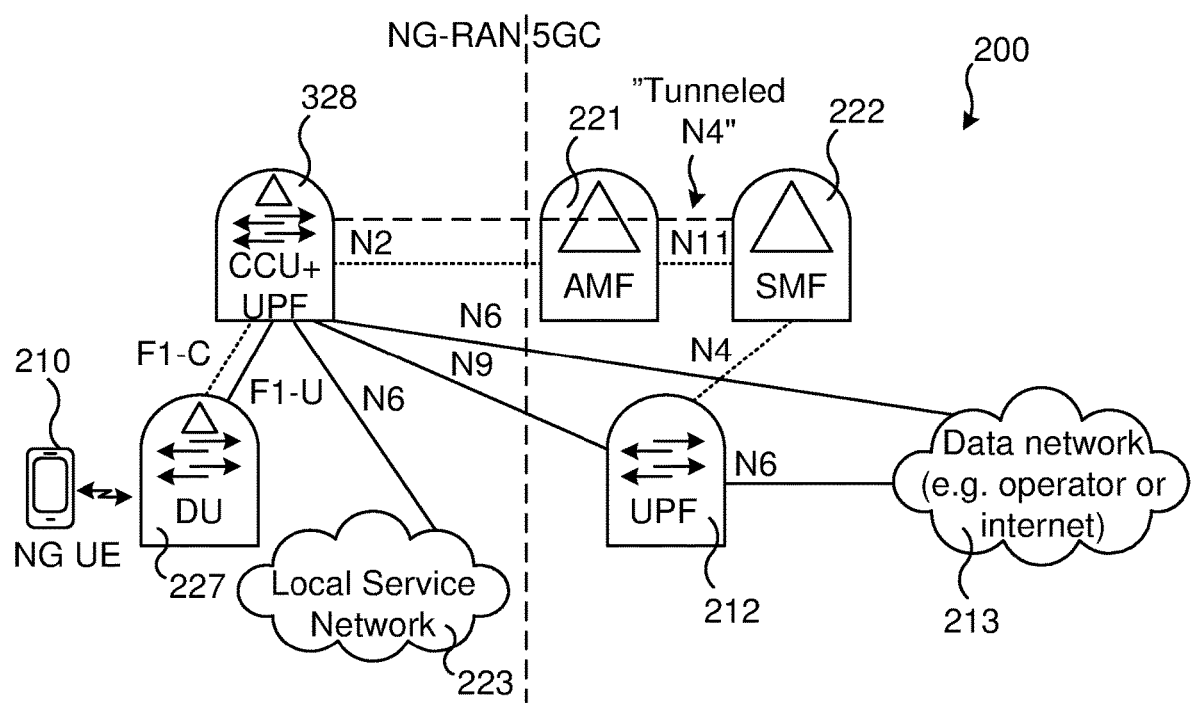
FIG. 10 illustrates a 5G communication network implementing a network node configured to connect a wireless communication device to a user plane in the network according to another embodiment.

FIG. 10 illustrates a 5G communication network 200 implementing a network node 328 configured to connect a wireless communication device 210 (i.e. the NG UE) to the network 200 according to an embodiment, being a variant of that shown in FIG. 4.

In the following, the network node 328 according to the embodiment will be referred to as a Combined Central Unit and User Plane Function (CCU-UPF).

As is shown in FIG. 10, the NG-RAN comprises a CCU-UPF 328 according to the embodiment hosting the RRC protocol and the control plane part of the PDCP protocol, i.e. the functionality of the CU-CP shown in FIG. 4. Further, the UPF functionality and CU-UP functionality is integrated within the CCU-UPF 328. Hence, the CCU-UPF 328 further hosts the SDAP protocol and the user plane part of the PDCP protocol.

The CCU-UPF 328 connects to an AMF 221 via the N2 interface, and to a DU 227 via an F1-C interface, which DU 227 is responsible for connecting the NG UE 210 to the control plane via interface F1-C and to the user plane via interface F1-U.

The CCU-UPF 328 connects to a local service network 223 and a data network 213 via the N6 interface, and to a UPF 212 via the N9 interface (or to only one of the network 213 and the UPF 212). Any combination of these scenarios is possible.

Further, the CCU-UPF 328 is arranged with a tunneled interface passing over the AMF 221 to the SMF 222 via which the SMF 222 is controlling the UPF functionality of the CCU-UPF 328 by means of transparent data containers. Hence, the tunneled interface replacing the N4 interface of the CCU-UPF 328 passes over the N2 and N11 interfaces. The N11 interface can alternatively be realized using service-based interfaces utilized by the AMF 221 and SMF 222, i.e. Namf and Nsmf, respectively.

Advantageously, with the CCU-UPF 328 user plane latency, control plane latency, as well as number of signalling interfaces in the network is reduced. Further, the CCU-UPF 328 advantageously also enables removal of the user plane tunnel between 5GC and NG-RAN as the N3 interface becomes an internal interface in the CCU-UPF 328, and so will the E1 interface.

Figure 11:
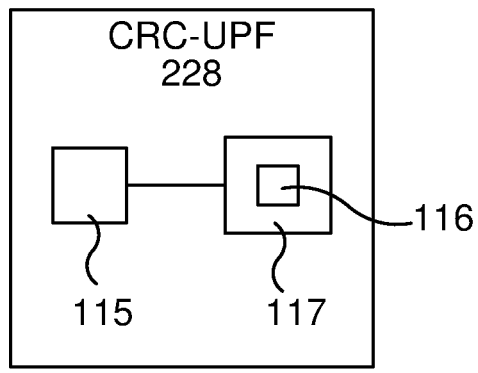
FIG. 11 shows a CRC-UPF according to an embodiment.

FIG. 11 illustrates a CRC-UPF 228 according to an embodiment. The steps of the method performed by the CRC-UPF 228 of enabling establishment of user plane connectivity for a wireless communication device with a wireless communication network according to embodiments are in practice performed by a processing unit 115 embodied in the form of one or more microprocessors arranged to execute a computer program 116 downloaded to a suitable storage volatile medium 117 associated with the microprocessor, such as a Random Access Memory (RAM), or a non-volatile storage medium such as a Flash memory or a hard disk drive. The processing unit 115 is arranged to cause the CRC-UPF 228 to carry out the method according to embodiments when the appropriate computer program 116 comprising computer-executable instructions is downloaded to the storage medium 117 and executed by the processing unit 115. The storage medium 117 may also be a computer program product comprising the computer program 116. Alternatively, the computer program 116 may be transferred to the storage medium 117 by means of a suitable computer program product, such as a Digital Versatile Disc (DVD) or a memory stick. As a further alternative, the computer program 116 may be downloaded to the storage medium 117 over a network. The processing unit 115 may alternatively be embodied in the form of a digital signal processor (DSP), an application specific integrated circuit (ASIC), a field-programmable gate array (FPGA), a complex programmable logic device (CPLD), etc.

Figure 12:
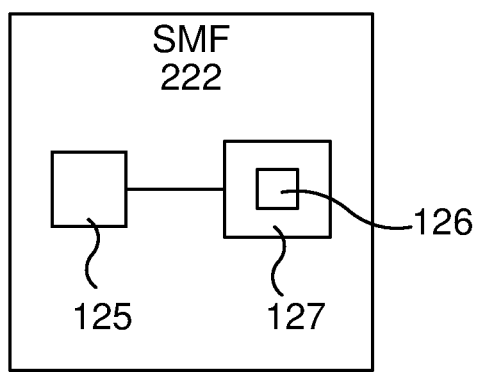
FIG. 12 shows an SMF according to an embodiment.

FIG. 12 illustrates a core network control plane function 222 configured to provide session management according to an embodiment in the form of an SMF. The steps of the method performed by the SMF 222 of enabling establishment of user plane connectivity for a wireless communication device with a wireless communication network according to embodiments are in practice performed by a processing unit 125 embodied in the form of one or more microprocessors arranged to execute a computer program 126 downloaded to a suitable storage volatile medium 127 associated with the microprocessor, such as a Random Access Memory (RAM), or a non-volatile storage medium such as a Flash memory or a hard disk drive. The processing unit 125 is arranged to cause the SMF 222 to carry out the method according to embodiments when the appropriate computer program 126 comprising computer-executable instructions is downloaded to the storage medium 127 and executed by the processing unit 125. The storage medium 127 may also be a computer program product comprising the computer program 126. Alternatively, the computer program 126 may be transferred to the storage medium 127 by means of a suitable computer program product, such as a Digital Versatile Disc (DVD) or a memory stick. As a further alternative, the computer program 126 may be downloaded to the storage medium 127 over a network. The processing unit 125 may alternatively be embodied in the form of a digital signal processor (DSP), an application specific integrated circuit (ASIC), a field-programmable gate array (FPGA), a complex programmable logic device (CPLD), etc.

Figure 13:
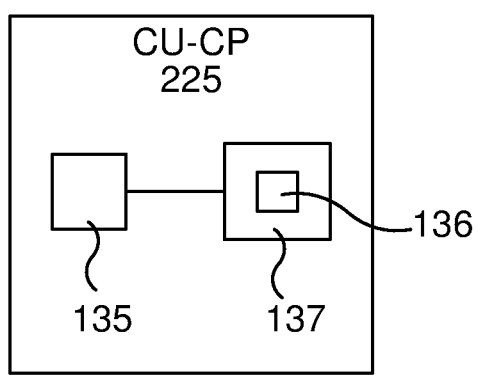
FIG. 13 shows a CU-CP according to an embodiment.

FIG. 13 illustrates a radio access control network control plane function 225 according to an embodiment in the form of a CU-CP. The steps of the method performed by the CU-CP 225 of enabling establishment of user plane connectivity for a wireless communication device with a wireless communication network according to embodiments are in practice performed by a processing unit 135 embodied in the form of one or more microprocessors arranged to execute a computer program 136 downloaded to a suitable storage volatile medium 137 associated with the microprocessor, such as a Random Access Memory (RAM), or a non-volatile storage medium such as a Flash memory or a hard disk drive. The processing unit 135 is arranged to cause the CU-CP 225 to carry out the method according to embodiments when the appropriate computer program 136 comprising computer-executable instructions is downloaded to the storage medium 137 and executed by the processing unit 135. The storage medium 137 may also be a computer program product comprising the computer program 136. Alternatively, the computer program 136 may be transferred to the storage medium 127 by means of a suitable computer program product, such as a Digital Versatile Disc (DVD) or a memory stick. As a further alternative, the computer program 126 may be downloaded to the storage medium 137 over a network. The processing unit 135 may alternatively be embodied in the form of a digital signal processor (DSP), an application specific integrated circuit (ASIC), a field-programmable gate array (FPGA), a complex programmable logic device (CPLD), etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a core network control plane function of a fifth generation (5G) wireless communication network configured to provide session management function (SMF) for enabling establishment of user plane connectivity for a wireless communication device with the 5G wireless communication network, the core network control plane function being part of a 5G core (5GC) of the 5G wireless communication network, the method comprising:
   receiving, from an access and mobility function of the 5GC configured to provide mobility management for the wireless communication device, a request to establish user plane connectivity for the wireless communication device;
   preparing configuration data to configure core network user plane functionality, wherein control plane functionality and user plane functionality are separated at a radio access network for the wireless communication device; and
   transmitting the configuration data to a network node that combines the core network user plane functionality and radio access network user plane functionality to service user plane data for the wireless communication device.

2. The method of claim 1, further comprising:
   receiving, from the access and mobility function, a transparent data container comprising configuration data to configure the radio access network user plane functionality of said network node, said transparent data container having been prepared at a radio access control network control plane function; and
   transmitting, to said network node, the transparent data container comprising configuration data to configure the radio access network user plane functionality of said network node.

3. The method of claim 1, wherein the receiving from the access and mobility function of the request to establish the user plane connectivity for the wireless communication device further comprises:

receiving a message indicating whether the network node providing said core network user plane functionality and radio access network user plane functionality is configured in the wireless communication network, and which core network user plane functionality is provided by the network node.

4. The method of claim 1, wherein the preparing of the configuration data to configure core network user plane functionality further comprises:

preparing a recommendation to a radio access control network control plane function regarding selection of the network node providing said core network user plane functionality and radio network user plane functionality.

5. A core network control plane function of a fifth generation (5G) wireless communication network configured to provide session management function (SMF) for enabling establishment of a user plane connectivity for a wireless communication device with the 5G wireless communication network, the core network control plane function being part of a 5G core (5GC) of the 5G wireless communication network, the core network control plane function comprising:

a processing unit; and a memory containing instructions which, when executed by said processing unit, cause the core network control plane function to:

receive, from an access and mobility function of the 5GC configured to provide mobility management for the wireless communication device, a request to establish user plane connectivity for the wireless communication device;

prepare configuration data to configure core network user plane functionality, wherein control plane functionality and user plane functionality are separated at a radio access network for the wireless communication device; and transmit the configuration data to a network node that combines the core network user plane functionality and radio access network user plane functionality to service user plane data for the wireless communication device.

6. The core network control plane function of claim 5, further to:

receive, from the network node, a response message comprising a transparent data container including a confirmation of the configuration of the radio access network user plane function in the network node.

7. The core network control plane function of claim 6, further to:

transmit, to the access and mobility function, the transparent data container including the confirmation of the configuration of the radio access network user plane function in the network node.

8. The core network control plane function of claim 5, further to:

receive, from the access and mobility function, a transparent data container comprising configuration data to configure radio access network user plane functionality of said network node, said transparent data container having been prepared at a radio access control network control plane function; and transmit, to said network node, the transparent data container comprising configuration data to configure the radio access network user plane functionality of said network node.

9. The core network control plane function of claim 5, when receiving, from the access and mobility function, the request to establish the user plane connectivity for the wireless communication device is further to:

receive a message indicating whether the network node providing said core network user plane functionality and radio access network user plane functionality is configured in the wireless communication network, and which core network user plane functionality is provided by the network node.

10. The core network control plane function of claim 5, when preparing the configuration data to configure core network user plane functionality is further to:

prepare a recommendation to a radio access control network control plane function regarding selection of the network node providing said core network user plane functionality and radio network user plane functionality.

* * * * *